United States Patent
Tan et al.

(10) Patent No.: US 9,025,166 B2
(45) Date of Patent: May 5, 2015

(54) PROXIMITY SENSING METHOD, PROXIMITY SENSING DEVICE, AND ELECTRONIC DEVICE THEREOF

(71) Applicant: Lite-On Singapore Pte. Ltd., Midview (SG)

(72) Inventors: Tong-Tee Tan, Singapore (SG); John Julius De Leon Asuncion, Singapore (SG); Lee-Cheng Tay, Singapore (SG)

(73) Assignee: Lite-On Singapore Pte. Ltd., Midview (SG)

( * ) Notice: Subject to any disclaimer, the term of this patent is extended or adjusted under 35 U.S.C. 154(b) by 0 days.

(21) Appl. No.: 14/068,975

(22) Filed: Oct. 31, 2013

(65) Prior Publication Data

US 2014/0340692 A1 Nov. 20, 2014

(30) Foreign Application Priority Data

May 20, 2013 (TW) .............................. 102117732 A (51) Int. Cl.
*G01B 11/14* (2006.01)
*G01S 17/02* (2006.01)

(52) U.S. Cl.
CPC .................................. *G01S 17/026* (2013.01)

(58) Field of Classification Search
USPC .................................................. 356/614, 620
See application file for complete search history.

(56) References Cited

U.S. PATENT DOCUMENTS

2006/0291706 A1* 12/2006 Gunstream et al. ........... 382/128
2009/0024331 A1* 1/2009 Tomaney et al. ............... 702/19

* cited by examiner

*Primary Examiner* — Tri T Ton
(74) *Attorney, Agent, or Firm* — Li & Cai Intellectual Property (USA) Office (57) ABSTRACT

An exemplary embodiment of the present disclosure illustrates a proximity sensing method used in a controller of a proximity sensing device. Firstly, a cross talk value is initialized. After the cross talk value is initialized, whether the cross talk value should be updated is judged at least according to a first sensing value currently received from a sensing unit of the proximity sensing device. When the cross talk value is judged to be updated, the cross talk value is updated at least according to a first sensing value. Then, a compensated sensing value is obtained by subtracting the cross talk value from the first sensing value.

18 Claims, 7 Drawing Sheets

PROXIMITY SENSING METHOD, PROXIMITY SENSING DEVICE, AND ELECTRONIC DEVICE THEREOF

BACKGROUND

1. Technical Field

The present disclosure is related to a sensing device, and in particular to, a proximity sensing method, a proximity sensing device, and an electronic device thereof, which are capable of cancelling the cross talk.

2. Description of Related Art

The proximity sensing device is a sensor for detecting whether an object to be tested exists within a specific distance from the proximity sensing device. The proximity sensing device can have multiple different implementations, and the implemented is determined according to the specific distance and the type of the object to be tested. Generally, according to the implementation of the proximity sensing devices, the proximity sensing device can be a capacitive, inductive, or optical proximity sensing device.

Recently, the optical proximity sensing device is widely used in the electronic products of different kinds, especially the smart phone. Since the smart phone has the touch control panel, when the user holds the smart phone near his/her ear to talk, the screen of the smart phone may be mistakenly touched, and some specific procedure (such as ending talk, inputting specific strings) may be erroneously activated. Accordingly, the smart phone can sense an object to be tested exists within a specific distance from the smart phone by using the an optical proximity sensing device installed in the smart phone, such that the touch control function is disabled temporarily to prevent the erroneous touch of the user during talk from activating some specific procedure.

SUMMARY

An exemplary embodiment of the present disclosure provides a proximity sensing method used in a controller of a proximity sensing device. Firstly, a cross talk value is initialized. After the cross talk value is initialized, whether the cross talk value should be updated is judged at least according to a first sensing value currently received from a sensing unit of the proximity sensing device. When the cross talk value is judged to be updated, the cross talk value is updated at least according to a first sensing value. Then, a compensated sensing value is obtained by subtracting the cross talk value from the first sensing value.

An exemplary embodiment of the present disclosure provides a proximity sensing device comprising a light emitting unit, a sensing unit, and a controller. The light emitting unit is used to emitting a first light to an object to be tested. The sensing unit is used to sense a second light entering the sensing unit. The controller has multiple circuits to perform the following steps. Firstly, a cross talk value is initialized. After the cross talk value is initialized, whether the cross talk value should be updated is judged at least according to a first sensing value currently received from a sensing unit of the proximity sensing device. When the cross talk value is judged to be updated, the cross talk value is updated at least according to a first sensing value. Then, a compensated sensing value is obtained by subtracting the cross talk value from the first sensing value.

An exemplary embodiment of the present disclosure provides an electronic device, and the electronic device comprises a function circuit and the above mentioned proximity sensing device.

To sum up, since the cross talk value is reasonably updated, the sensing sensitivity and precision of the above proximity sensing method, proximity sensing device, and electronic device are enhances, and the dynamic range of the compensated sensing value is increased.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or similar parts.

[Exemplary Embodiment of Proximity Sensing Device]

Figure 1:
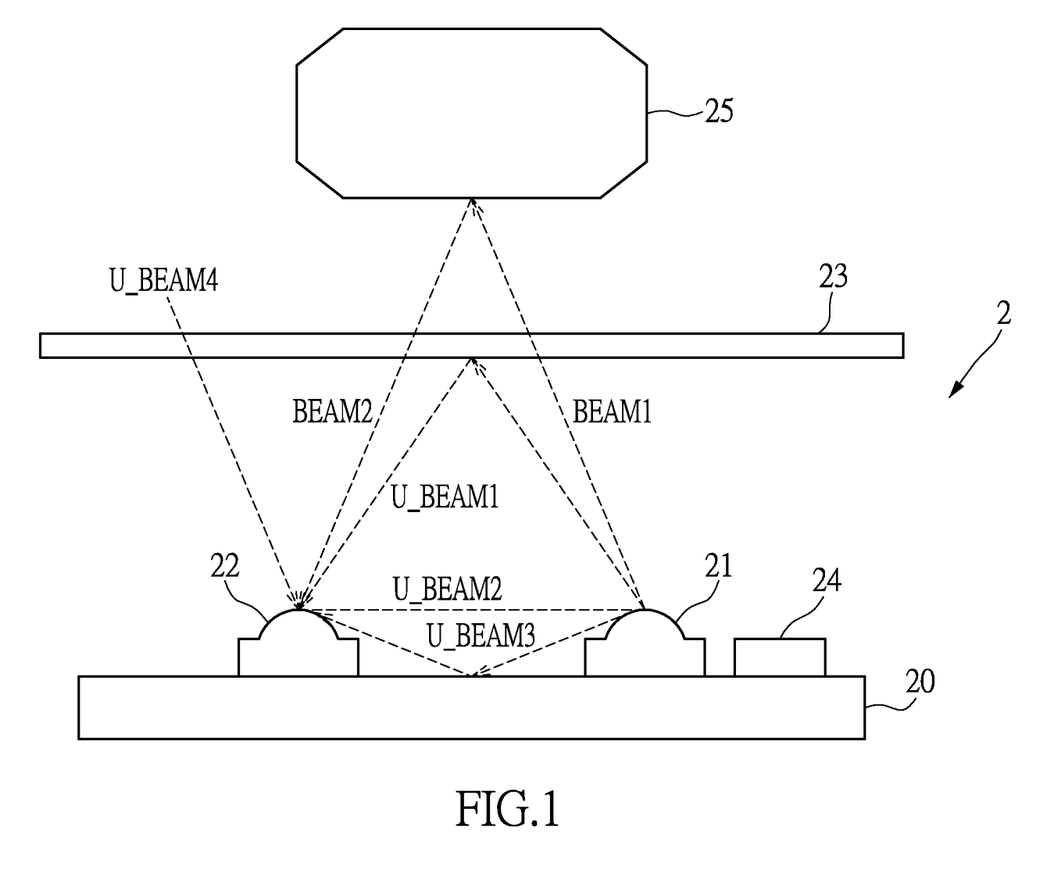
FIG. 1 is a schematic diagram of a proximity sensing device according to an exemplary embodiment of the present disclosure.

Referring to FIG. 1, FIG. 1 is a schematic diagram of a proximity sensing device according to an exemplary embodiment of the present disclosure. The proximity sensing device 2 comprises a substrate 20, a light emitting unit 21, a sensing unit 22, an optical lens 23, and a controller 24, and detects a distance between an object 25 to be tested and the proximity sensing device 2 based on the light reflection. The light emitting unit 21, the sensing unit 22, and the controller 24 are located on an upper surface of the substrate 20, wherein the controller 24 is connected to the light emitting unit 21 and the sensing unit 22 via the inner conduction lines of the substrate 20 or the bonding wires.

The light emitting unit 21 is used to emit a light BEAM1, and the sensing unit 22 is used to sense whether a light BEAM2 is reflected from the object 25 to be tested. When the distance between the object 25 to be tested and the proximity sensing device 2 is less than or equal to a specific distance, the object 25 to be tested reflects the light BEAM1 emitted by the light emitting unit 21, and the sensing unit 22 senses the light BEAM2 reflected from the object to be tested 25. Thus, the controller 24 can read the sensing value obtained by the sensing unit 22, so as to judge the distance between the object 25 to be tested and the proximity sensing device 2.

Since the light lights U_BEAM1 through U_BEAM4 are cross talks which affect the sensitivity of the sensing unit 22, even decrease the precision whether the object 25 to be tested exists within the specific distance from the proximity sensing device 2. Thus, when the proximity sensing device 2 senses each time, the controller 24 would judge whether the cross talk value should be updated, and subtract the cross talk value from the sensing value to obtain the compensated sensing value. Next, the controller 24 further judges the distance between the object 25 to be test and the proximity sensing device 2 according to the compensated sensing value. For example, the controller 24 can judge whether the distance between the object 25 to be test and the proximity sensing device 2 is less than the specific distance (i.e. whether the object 25 to be tested exists within the specific distance from the proximity sensing device 2) according to whether the compensated sensing value is larger than a specific threshold value.

In one implementation of the present disclosure, the sensing value received by the controller 24 can be the first-time sensing value which is obtained by the sensing 22 unit after the proximity sensing device 2 is activated. The controller 24 judges whether the first-time sensing value is larger than a first threshold value, wherein the first threshold value is (1/m) times of the max compensated sensing value, and m is larger than 1. When the first-time sensing value is larger than the (1/m) times of the max compensated sensing value, the controller 24 initializes the cross talk value to be a second threshold value, and subtracts the cross talk value from the first-time sensing value to obtain the compensated sensing value, wherein the second threshold value is (1/n) times of the max compensated sensing value, and n is larger than 1. When the first-time sensing value is not larger than the first threshold value, the controller 24 initializes the cross talk value to be the first-time sensing value, and subtracts the cross talk value from the first-time sensing value to obtain the compensated sensing value, wherein the compensated sensing value is 0. In the exemplary embodiment of the present disclosure, m and n can be equal to each other, and for example can be 4, but the present disclosure is not limited thereto.

Next, when the sensing value received by the controller 24 is the X-time sensing value which is obtained by the sensing unit 22 after the proximity sensing device 2 is activated (X is an integer larger than or equal to 2), the controller 24 judges whether the X-time sensing value is less than the cross talk value. When the X-time sensing value is less than the cross talk value, the controller 24 updates the cross talk value to be the X-time sensing value, and subtracts the cross talk value from the X-time sensing value to obtain the compensated sensing value, wherein the compensated sensing value is 0. When the X-time sensing value is not less than the cross talk value, the controller 24 does not update the cross talk value, but directly subtracts the cross talk value from the X-time sensing value to obtain the compensated sensing value to obtain the compensated sensing value.

From the above descriptions, the controller 24 can initialize the cross talk value, and an initial value of the cross talk value is judged according to whether the first-time sensing value is larger than the first threshold value. However, the present disclosure is not limited thereto. In another one exemplary embodiment, the cross talk value can be directly initialized to be the second threshold value. In addition, the controller 24 may not only judge the initial value of the cross talk value according to whether the first-time sensing value is larger than the first threshold value, but also judge the initial value of the cross talk value according to whether the currently obtained sensing value is larger than the first threshold value every period or while the user inputs the initialization command.

From the above descriptions, after the controller 24 initializes the cross talk value, when proximity sensing device 2 senses every time, the controller 24 judges whether the currently obtained sensing value is less than the cross talk value to update the cross talk value. However, in another one exemplary embodiment of the present disclosure, when proximity sensing device 2 senses every time, the controller 24 judges whether the currently obtained statistical sensing value is less than the cross talk value to update the cross talk value.

The statistical sensing value can be an average sensing value, for example, the running average sensing value, and the sensing values with the large variations are excluded from the statistical calculation. When the sensing value received by the controller 24 is the X-time sensing value which is obtained by the sensing unit 22 after the proximity sensing device 2 is activated (X is larger than or equal to 2), the controller 24 judges whether currently obtained average sensing value is less than the cross talk value. When the currently obtained average sensing value is less than the cross talk value, the controller 24 updates the cross talk value to be the currently obtained average sensing value, and subtracts the cross talk value from the X-time sensing value to obtain the compensated sensing value, wherein the compensated sensing value is 0. When the currently obtained average sensing value is not less than the cross talk value, the controller 24 does not update the cross talk value, but directly subtracts the cross talk value from the X-time sensing value to obtain the compensated sensing value.

In the exemplary embodiment of the present disclosure, the light emitting unit 21 can be an infrared ray emitter, and the sensing unit 22 can be the infrared ray sensor. However, the implementations of the light emitting unit 21 and the sensing unit 22 are not used to limit the present disclosure. Furthermore, the controller 24, the light emitting unit 21, the sensing unit 22 may not share the substrate 20 (i.e. located on the different substrates) in another one exemplary embodiment. The controller 24 can be implemented by the hardware circuits or the software. For example, the software based controller 24 may be implemented by using the processing unit and volatile memory of the electronic device having the proximity sensing device 2. The electronic device can be the smart phone or other computing device, wherein when the electronic device is the smart phone, the object 25 to be tested can for example be the ear or face of the user.

[Exemplary Embodiment of Controller]

Figure 2:
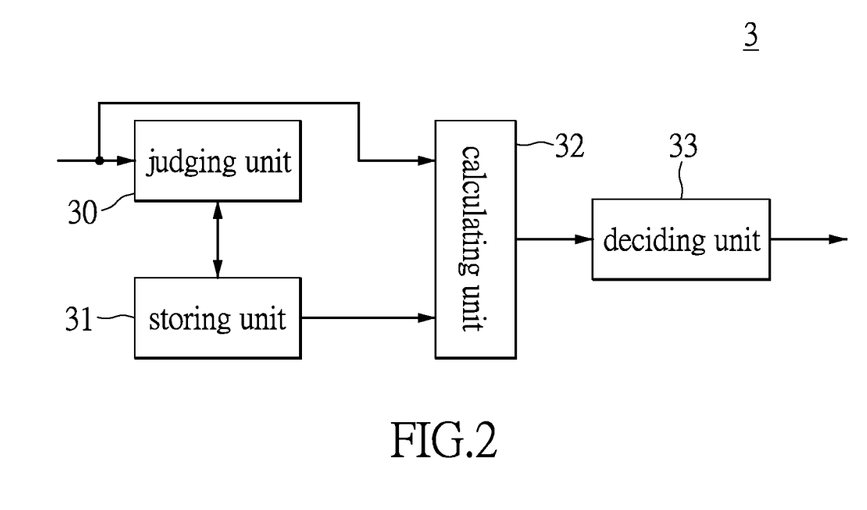
FIG. 2 is a block diagram of a controller of a proximity sensing device according to an exemplary embodiment of the present disclosure.

Referring to FIG. 2, FIG. 2 is a block diagram of a controller of a proximity sensing device according to an exemplary embodiment of the present disclosure. The controller 3 comprises a judging unit 30, a storing unit 31, a calculating unit 32, and a deciding unit 33. The judging unit 30 is electrically connected to the storing unit 31, and the calculating unit 32 is electrically connected to the deciding unit 33 and the storing unit 31. The implementation of the controller 3 in the exemplary embodiment is not used to limit the present disclosure. The controller 3 is implemented by multiple circuits.

The judging unit 30 is used to judge whether the cross talk value should be initialized or updated according to the currently obtained sensing value. In addition, the manner to judge whether the cross talk value should be initialized or updated and the manner to update or initialize the cross talk value according to the currently obtained sensing value are illustrated in the above descriptions, thus omitting the redundant descriptions. The storing unit 31 is used to store the cross talk value, and can be the volatile memory, but the present disclosure is not limited thereto. The calculating unit 32 is used to subtract the cross talk value from the currently obtained sensing value to obtain the compensated sensing value. The deciding unit 33 judges the distance between the object to be tested and the proximity sensing device according to the compensated sensing value, for example, judges whether the object to be tested exists within the specific distance from the proximity sensing device.

[Exemplary Embodiment of Proximity Sensing Method]

Figure 3:
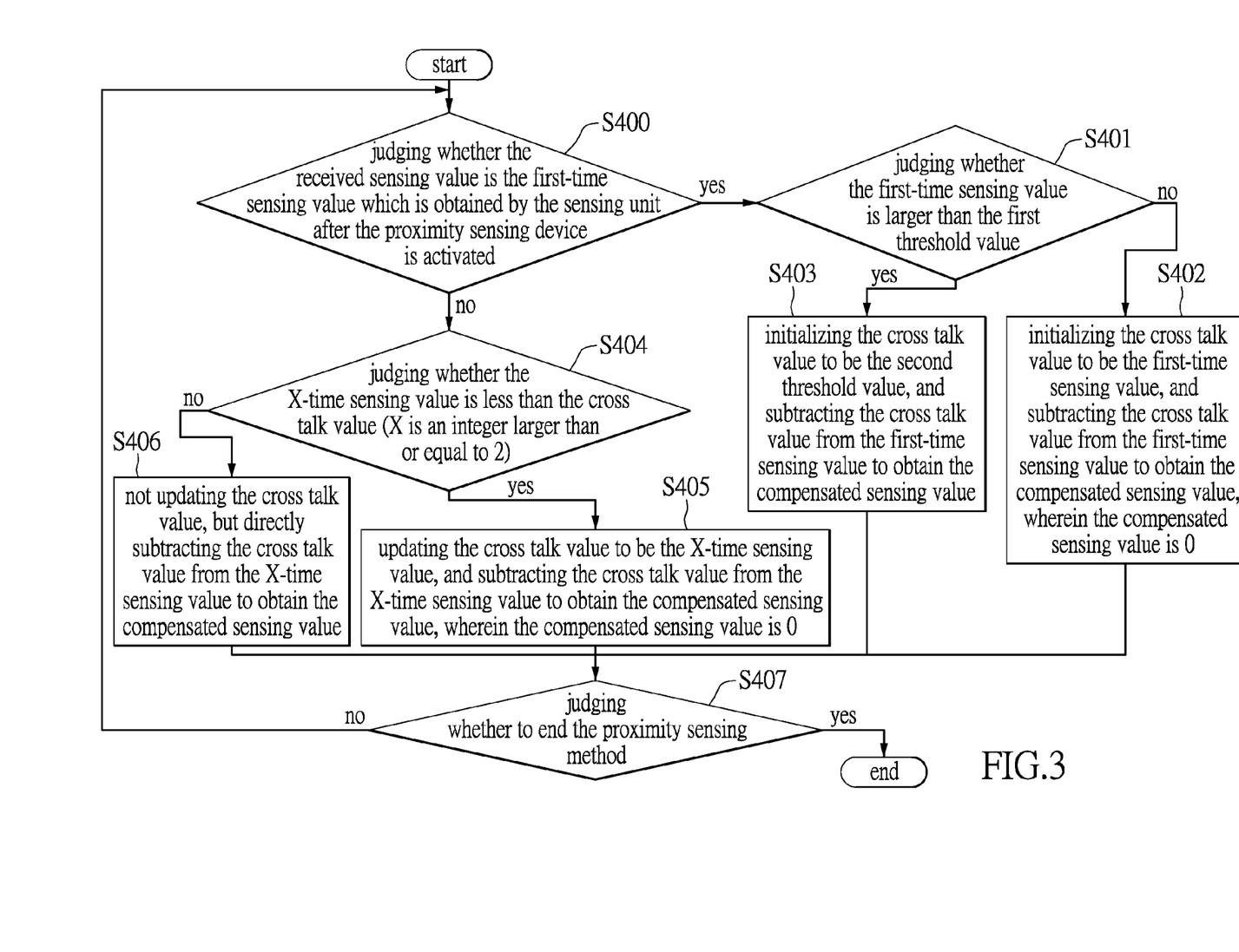
FIG. 3 is a flow chart of a proximity sensing method according to an exemplary embodiment of the present disclosure.

Referring to FIG. 3, FIG. 3 is a flow chart of a proximity sensing method according to an exemplary embodiment of the present disclosure. The proximity sensing method can be executed in the controller of FIG. 2, but the present disclosure does not limit the device for executing the proximity sensing method. It is noted that, steps S400 through S403 form the procedure for initializing the cross talk value, and steps S404 through S406 form the procedure for updating the cross talk value. The following descriptions show the details of each step.

Firstly, at step S400, the controller judges whether the received sensing value is the first-time sensing value which is obtained by the sensing unit after the proximity sensing device is activated. When the controller judges the sensing value is the first-time sensing value which is obtained by the sensing unit after the proximity sensing device is activated, step S401 is executed next; when the controller judges the sensing value is the X-time sensing value which is obtained by the sensing unit after the proximity sensing device is activated (X is an integer larger than or equal to 2), step S404 is executed next.

At step S401, the controller judges whether the first-time sensing value is larger than the first threshold value, wherein the first threshold value is (1/m) times of the max compensated sensing value, and m is larger than 1. When the first-time sensing value is larger than the first threshold value, step S403 is executed next; when the first-time sensing value is not larger than the first threshold value, step S402 is executed next. At step S402, the controller initializes the cross talk value to be the first-time sensing value, and subtracts the cross talk value from the first-time sensing value to obtain the compensated sensing value, wherein the compensated sensing value is 0. At step S403, the controller initializes the cross talk value to be the second threshold value, and subtracts the cross talk value from the first-time sensing value to obtain the compensated sensing value, wherein the second threshold value is (1/n) times of the max compensated sensing value, and n is an integer larger than 1. In the exemplary embodiment of the present disclosure, m and n are equal to each other, and for example can be 4, but the present disclosure is not limited thereto.

Since the first-time sensing value may be the sensing value which is obtained under the condition that the object to be tested exists within the specific distance from the proximity sensing device, the cross talk value cannot be directly initialized to be the first-time sensing value, and the manner for initializing the cross talk value must be judged according to whether the first-time sensing value is larger than the first threshold value, so as to enhance the sensing sensitivity and precision that the proximity sensing device senses whether the object to be tested exists within the specific distance from the proximity sensing device.

Next, at step S404, the controller judges whether the X-time sensing value is less than the cross talk value (X is an integer larger than or equal to 2). When the X-time sensing value is less than the cross talk value, step S405 is executed next; when the X-time sensing value is not less than the cross talk value, step S406 is executed next. At step S405, the controller updates the cross talk value to be the X-time sensing value, and subtracts the cross talk value from the X-time sensing value to obtain the compensated sensing value, wherein the compensated sensing value is 0. At step S406, the controller does not update the cross talk value, but directly subtracts the cross talk value from the X-time sensing value to obtain the compensated sensing value.

Since the previously initialized or updated cross talk value may not be correct, whether the cross talk value should be updated must be judged according to the current obtained sensing value after the cross talk value is initialized or updated, so as to enhance the sensing sensitivity and precision that the proximity sensing device senses whether the object to be tested exists within the specific distance from the proximity sensing device.

Last, at step S407, the controller judges whether to end the proximity sensing method. When that the proximity sensing method should be ended is judged, the proximity sensing method is then ended; when that the proximity sensing method should not be ended is judged, step S400 is executed repeatedly. For example, when the proximity sensing device currently does not need to sense, the proximity sensing device should be further enter a sleeping or standby state to save energy, the controller currently judges to end the proximity sensing method. When the proximity sensing device is indicated to enter the operating state again (i.e. the proximity sensing device is activated again), the proximity sensing method is executed again.

Furthermore, in FIG. 3, before step S407 is executed, the proximity sensing method can further comprises the step that the controller judges the distance between the object to be tested and the proximity sensing device is less than the specific distance according to whether the compensated sensing value is larger than a specific threshold value (the step is not shown in FIG. 3).

[Another One Exemplary Embodiment of Controller]

Figure 4:
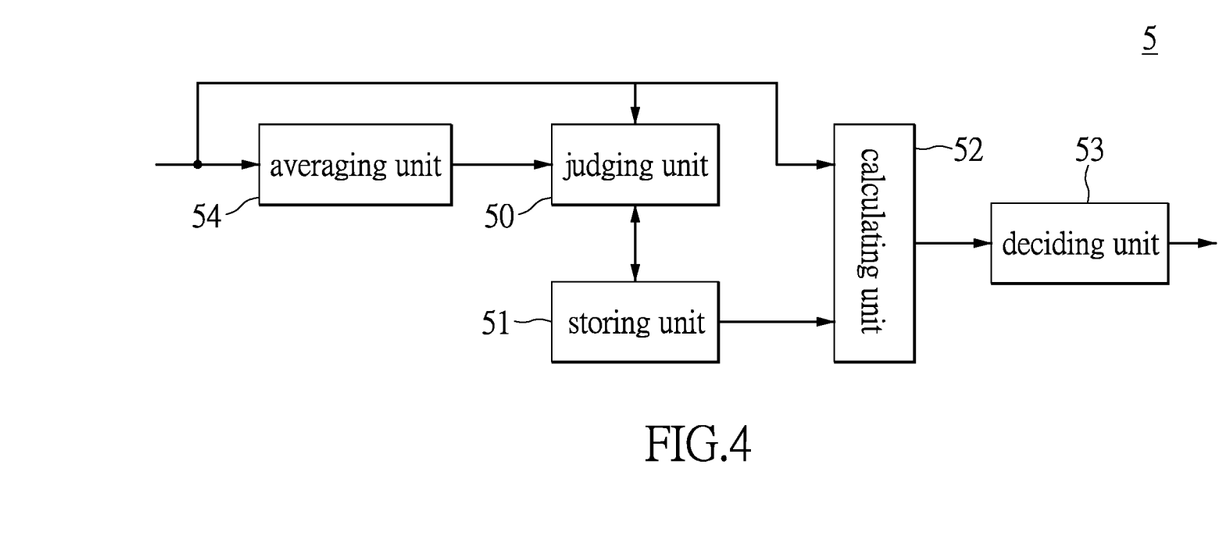
FIG. 4 is a block diagram of a controller of a proximity sensing device according to another one exemplary embodiment of the present disclosure.

Referring to FIG. 4, FIG. 4 is a block diagram of a controller of a proximity sensing device according to another one exemplary embodiment of the present disclosure. The controller 5 comprises a judging unit 50, a storing unit 51, a calculating unit 52, a deciding unit 53, and an averaging unit 54. The judging unit 50 is electrically connected to the storing unit 51 and the averaging unit 54, and the calculating unit 52 is electrically connected to the deciding unit 53 and the storing unit 51. The implementation of the controller 5 in the exemplary embodiment is not used to limit the present disclosure, and the controller 5 is implemented by multiple circuits.

The averaging unit 54 is used to calculate the currently average sensing value, and the averaging unit 54 can be a running average calculation circuit. The judging unit 30 is used to judge whether the cross talk value should be initialized according to the currently sensing value, and whether the cross talk value should be updated according to the currently averaging sensing value. In addition, the manner for judging whether the cross talk value should be initialized or updated, the manner for initializing the cross talk value according to the currently sensing value, and the manner for updating the cross talk value according to the currently average sensing value are illustrated in the above descriptions, thus omitting the redundant descriptions. The functions of the storing unit 51, the calculating unit 52, and the deciding unit 53 are respectively similar to the storing unit 31, the calculating unit 32, and the deciding unit 33 in FIG. 2, thus omitting the redundant descriptions.

[Another One Exemplary Embodiment of Proximity Sensing Method]

Figure 5:
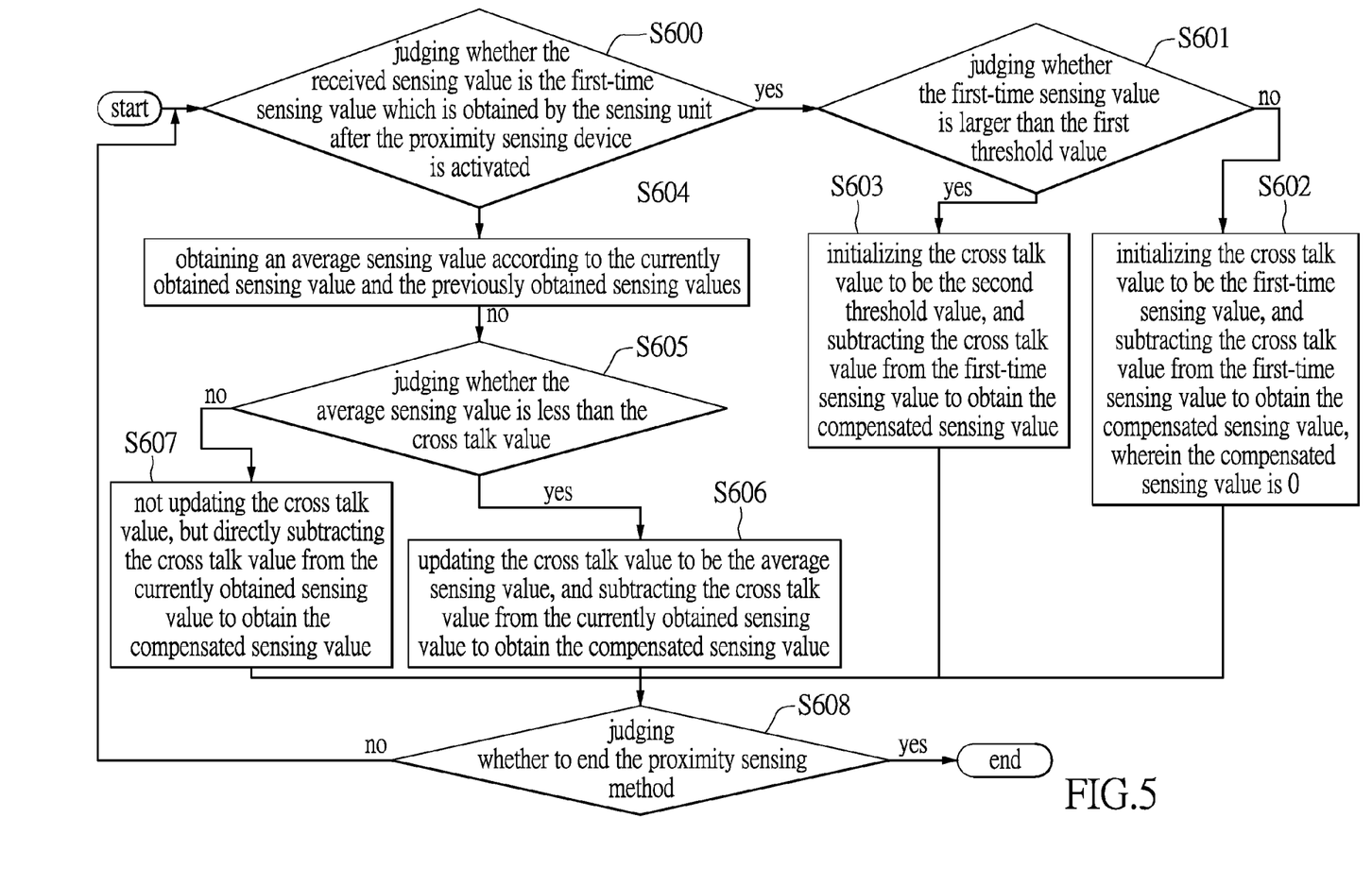
FIG. 5 is a flow chart of a proximity sensing method according to another one exemplary embodiment of the present disclosure.

Referring to FIG. 5, FIG. 5 is a flow chart of a proximity sensing method according to another one exemplary embodiment of the present disclosure. The proximity sensing method can be executed in the controller in the FIG. 4, but the present disclosure does not limit the device for executing the proximity sensing method. It is noted that, steps S400 through S603 form the procedure for initializing the cross talk value, and steps S604 through S607 form the procedure for updating the cross talk value.

Steps S600 through S603, and S608 are respectively similar to steps S400 through S403, and S407 in FIG. 3, thus omitting the redundant descriptions. At step S604, the controller obtains the average sensing value according to the currently obtained sensing value and the previously obtained sensing values. Next, at step S605, the controller judges whether the average sensing value is less than the cross talk value. When the average sensing value is less than cross talk value, step S606 is executed next; when the average sensing value is not less than cross talk value, step S607 is executed next. At step S606, the controller updates the cross talk value to be the average sensing value, and subtracts the cross talk value from the currently obtained sensing value to obtain the compensated sensing value. At step S607, the controller does not update the cross talk value, but directly subtracts the cross talk value from the currently obtained sensing value to obtain the compensated sensing value.

In addition, in FIG. 5, before step S608 is executed, the proximity sensing method can further comprises the step that the controller judges the distance between the object to be tested and the proximity sensing device is less than the specific distance according to whether the compensated sensing value is larger than a specific threshold value (the step is not shown in FIG. 5).

[Another One Exemplary Embodiment of Proximity Sensing Method]

Figure 6:
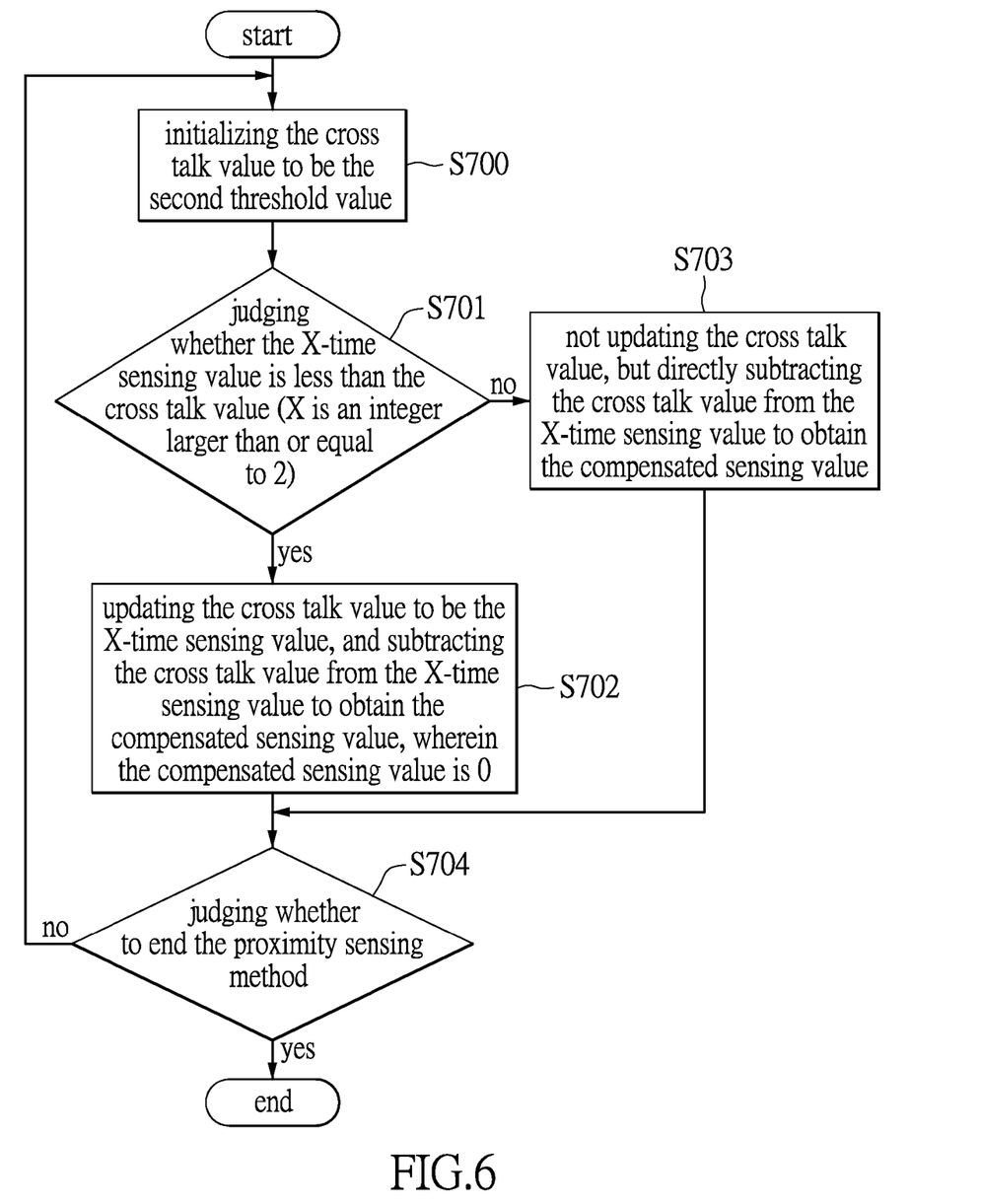
FIG. 6 is a flow chart of a proximity sensing method according to another one exemplary embodiment of the present disclosure.

Referring to FIG. 6, FIG. 6 is a flow chart of a proximity sensing method according to another one exemplary embodiment of the present disclosure. The proximity sensing method can be executed in the controller in the FIG. 2, but the present disclosure does not limit the device for executing the proximity sensing method. It is noted that, step S700 forms the procedure for initializing the cross talk value, and steps S701 through S703 form the procedure for updating the cross talk value.

Compared to FIG. 3, the procedure for initializing the cross talk value in FIG. 6 merely comprises step S700, and steps S701 through S704 are respectively similar to steps S404 through S407 in FIG. 3, thus omitting the redundant descriptions. At step S700, the controller directly initializes the cross talk value to be the second threshold value. Since the unreasonable cross talk value can be updated at steps S701 through S703, the proximity sensing method in the exemplary embodiment of the FIG. 6 does not consider whether the initial value of the cross talk value is reasonable.

[Another One Exemplary Embodiment of Proximity Sensing Method]

Figure 7:
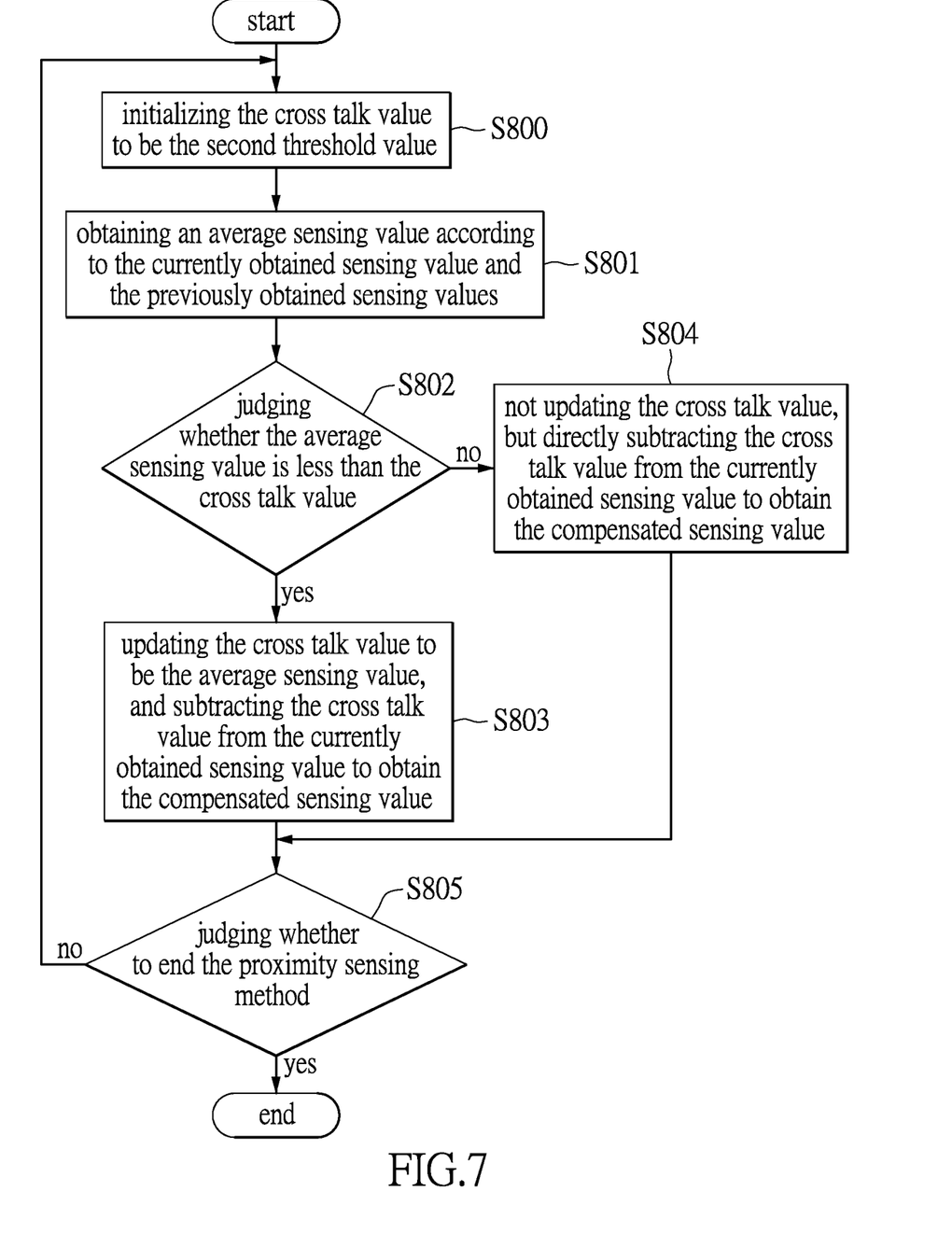
FIG. 7 is a flow chart of a proximity sensing method according to another one exemplary embodiment of the present disclosure.

Referring to FIG. 7, FIG. 7 is a flow chart of a proximity sensing method according to another one exemplary embodiment of the present disclosure. The proximity sensing method can be executed in the controller in the FIG. 4, but the present disclosure does not limit the device for executing the proximity sensing method. It is noted that, step S800 forms the procedure for initializing the cross talk value, and steps S801 through S805 form the procedure for updating the cross talk value.

Compared to FIG. 5, the procedure for initializing the cross talk value in FIG. 7 merely comprises step S800, and steps S801 through S805 are respectively similar to steps S604 through S608 in FIG. 5, thus omitting the redundant descriptions. At step S800, the controller directly initializes the cross talk value to be the second threshold value. Since the unreasonable cross talk value can be updated at steps S801 through S804, the proximity sensing method in the exemplary embodiment of the FIG. 7 does not consider whether the initial value of the cross talk value is reasonable.

[Exemplary Embodiment of Proximity Electronic Device]

An exemplary embodiment of the present disclosure further provides an electronic device comprising the above proximity sensing device or executing the above proximity sensing method. The electronic device can comprise the above proximity sensing device and a function circuit, wherein the electronic device can be for example a smart phone, and the function circuit can correspondingly be a smart phone chip module. When the user holds the electronic device to talk, the proximity sensing device can sense that the electronic device is close to the ear or face of the user, and the touch control function or other function of the electronic device is disabled to prevent from mistaken execution of some specific procedure. Naturally, the electronic device is not limited to be the smart phone, and the electronic device may further be a pad or an automatic vacuum cleaner.

[Possible Result of Exemplary Embodiment]

To sum up, the proximity sensing method, the proximity sensing device, and the electronic device thereof in the above exemplary embodiments do not need to execute the calibration procedure before leaving the factory, such that the testing time and the manufacturing cost are decreased. In addition, since the cross talk value is reasonably updated, the sensing sensitivity and precision of the proximity sensing method, the proximity sensing device, and the electronic device are enhanced, and the dynamic range of the compensated sensing value is increased. Furthermore, in the exemplary embodiment of the present disclosure, the proximity sensing device cannot need the additional nonvolatile memory, and thus the manufacturing cost and the chip area can be further decreased.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A proximity sensing method, used in a controller of a proximity sensing device, comprising:
   initializing a cross talk value;
   after the cross talk value is initialized, judging whether the cross talk value should be updated at least according to a first sensing value currently received from a sensing unit of the proximity sensing device;
   when that the cross talk value should be updated is judged, updating the cross talk value at least according to the first sensing value; and obtaining a compensated sensing value by subtracting the cross talk value from the first sensing value;

wherein the step of initializing the cross talk value comprises:

judging whether cross talk value should be initialized; and when that the cross talk value should be initialized is judged, deciding an initial value of the cross talk value according to whether a third sensing value received from the sensing unit is larger than a first threshold value, wherein the first threshold value is less than a max compensated sensing value.

2. The proximity sensing method according to claim 1, wherein when the first sensing value is less than the cross talk value, the cross talk value is updated to be the first sensing value; when the first sensing value is not less than the cross talk value, the cross talk value is not updated.

3. The proximity sensing method according to claim 1, wherein whether the cross talk value should be updated is judged further according to multiple second sensing values previously received by the sensing unit, wherein a statistical sensing value is obtained according to the second sensing values and the first sensing value, and whether the cross talk value should be updated is judged according to the statistical sensing value.

4. The proximity sensing method according to claim 3, wherein when the statistical sensing value is less than the cross talk value, the cross tale value is updated to be the statistical sensing value; when the statistical sensing value is not less than the cross talk value, the cross talk value is not updated.

5. The proximity sensing method according to claim 1, wherein when the third sensing value is larger than the first threshold value, the cross talk value is initialized to be a second threshold value, wherein the second threshold value is less than the max compensated sensing value; when the third sensing value is not larger than the first threshold value, the cross talk value is initialized to be the third sensing value.

6. The proximity sensing method according to claim 1, wherein whether the cross talk value should be initialized is judged according to whether the third sensing value is a first-time sensing value which is obtained by the sensing unit after the proximity sensing device is activated.

7. The proximity sensing method according to claim 5, wherein the first threshold value and the second threshold value are quarters of the max compensated sensing value.

8. The proximity sensing method according to claim 1, further comprising:

judging a distance between the proximity sensing device and an object to be tested according to the compensated sensing value.

9. A proximity sensing device, comprising:

a light emitting unit, used to emitting a first light to an object to be tested;

a sensing unit, used to sense a second light entering the sensing unit;

a controller, having multiple circuits used to perform steps of:

initializing a cross talk value;

after the cross talk value is initialized, judging whether the cross talk value should be updated at least according to a first sensing value currently received from a sensing unit of the proximity sensing device;

when that the cross talk value should be updated is judged, updating the cross talk value at least according to the first sensing value; and obtaining a compensated sensing value by subtracting the cross talk value from the first sensing value;

wherein the judging unit is used to further judge whether the cross talk value should be initialized, and when that the cross talk value should be initialized is judged, the judging unit decides an initial value of the cross talk value according to whether a third sensing value received from the sensing unit is larger than a first threshold value, wherein the first threshold value is less than a max compensated sensing value.

10. The proximity sensing device according to claim 9, wherein the circuits of the controller comprises:

a judging unit, used to initialize the cross talk value, and after the cross talk value is initialized, judge whether the cross talk value should be updated at least according to the first sensing value;

a storing unit, used to store the cross talk value; and a calculating unit, used to subtract the cross talk value from the first sensing value to obtain the compensated sensing value;

wherein when the first sensing value is less than the cross talk value, the judging unit updates the cross talk value to be the first sensing value; when the first sensing value is not less than the cross talk value, the judging unit does not update the cross talk value.

11. The proximity sensing device according to claim 9, wherein the circuits of the controller comprises:

an averaging unit, used to calculate an average sensing value of the first sensing value and multiple second sensing values, wherein the second sensing values are previously received from the sensing unit;

a judging unit, used to initialize the cross talk value, and after the cross talk value is initialized, judge whether the cross talk value should be updated at least according to the average sensing value; a storing unit, used to store the cross talk value; and a calculating unit, used to subtract the cross talk value from the first sensing value to obtain the compensated sensing value;

wherein when the average sensing value is less than the cross talk value, the judging unit updates the cross talk value to be the average sensing value; when the average sensing value is not less than the cross talk value, the judging unit does not update the cross talk value.

12. The proximity sensing device according to claim 9, when the third sensing value is larger than the first threshold value, the judging unit initializes the cross talk value to be a second threshold value, wherein the second threshold value is less than the max compensated sensing value; when the third sensing value is not larger than the first threshold value, the judging unit initializes the cross talk value to be the third sensing value.

13. The proximity sensing device according to claim 9, wherein the judging unit judges whether the cross talk value should be initialized according to whether the third sensing value is a first-time sensing value which is obtained by the sensing unit after the proximity sensing device is activated.

14. The proximity sensing device according to claim 12, wherein the first threshold value and the second threshold value are quarters of the max compensated sensing value.

15. The proximity sensing device according to claim 10, wherein the storing unit is a volatile memory.

16. The proximity sensing device according to claim 10, wherein the circuits of the controller further comprises:

a deciding unit, used to judge a distance between the proximity sensing device and the object to be tested according to the compensated sensing value.

17. An electronic device, comprising:
a function circuit; and
a proximity sensing device, comprising:
a light emitting unit, used to emitting a first light to an object to be tested;
a sensing unit, used to sense a second light entering the sensing unit;
a controller, having multiple circuits used to perform steps of:
initializing a cross talk value;
after the cross talk value is initialized, judging whether the cross talk value should be updated at least according to a first sensing value currently received from a sensing unit of the proximity sensing device;
when that the cross talk value should be updated is judged, updating the cross talk value at least according to the first sensing value; and
obtaining a compensated sensing value by subtracting the cross talk value from the first sensing value;
wherein the step of initializing the cross talk value comprises:
judging whether cross talk value should be initialized; and
when that the cross talk value should be initialized is judged, deciding an initial value of the cross talk value according to whether a third sensing value received from the sensing unit is larger than a first threshold value, wherein the first threshold value is less than a max compensated sensing value.

18. The electronic device according to claim 17, wherein the electronic device is a smart phone, and the function circuit is a smart phone chip module.

* * * * *